(12) United States Patent
O'leary

(10) Patent No.: US 11,909,193 B2
(45) Date of Patent: Feb. 20, 2024

(54) BUSWAY JOINT INTEGRAL TEMPERATURE SENSOR

(71) Applicant: Schneider Electric USA, Inc., Andover, MA (US)

(72) Inventor: Timothy O'leary, Antioch, TN (US)

(73) Assignee: Schneider Electric USA, Inc., Boston, MA (US)

( * ) Notice: Subject to any disclaimer, the term of this patent is extended or adjusted under 35 U.S.C. 154(b) by 473 days.

(21) Appl. No.: 17/163,090

(22) Filed: Jan. 29, 2021

(65) Prior Publication Data
US 2022/0247162 A1    Aug. 4, 2022

(51) Int. Cl.
*H02G 5/00* (2006.01)
*H02G 5/08* (2006.01)

(52) U.S. Cl.
CPC .............. *H02G 5/007* (2013.01); *H02G 5/08* (2013.01)

(58) Field of Classification Search
CPC .................................. H02G 5/007; H02G 5/08
See application file for complete search history.

(56) References Cited

U.S. PATENT DOCUMENTS

| | | | | | |
|---|---|---|---|---|---|
| 4,904,091 | A | * | 2/1990 | Ward | G01K 1/14 73/147 |
| 2012/0013471 | A1 | * | 1/2012 | Jones | G01R 31/69 340/584 |
| 2015/0030408 | A1 | * | 1/2015 | Groche | G01L 5/24 29/515 |
| 2016/0299012 | A1 | * | 10/2016 | Cano Rodriguez | G01K 13/00 |
| 2018/0321331 | A1 | * | 11/2018 | Finlay | F16B 39/12 |
| 2019/0020159 | A1 | * | 1/2019 | Wynnik | H02G 5/007 |
| 2019/0120890 | A1 | * | 4/2019 | Patel | G01K 1/14 |
| 2020/0278240 | A1 | * | 9/2020 | Sun | G01L 25/00 |
| 2021/0381916 | A1 | * | 12/2021 | Voski | G01L 5/24 |

FOREIGN PATENT DOCUMENTS

| | | | | |
|---|---|---|---|---|
| WO | WO-0022306 A1 | * | 4/2000 | B25B 23/14 |
| WO | 2012009146 A2 | | 1/2012 | |

OTHER PUBLICATIONS

Extended European Search Report dated Jun. 24, 2022 for corresponding European Patent Application No. 22151010.0-1001, 9 pages.

* cited by examiner

*Primary Examiner* — Abdullah A Riyami
*Assistant Examiner* — Thang H Nguyen
(74) *Attorney, Agent, or Firm* — Locke Lord LLP

(57) ABSTRACT

A busway joint for coupling two segments of an electrical distribution busway to each other comprising, a busway joint including a plurality of fins, a central body connecting each of the plurality of fins, and a bolt within the central body, wherein the bolt includes a cavity housing a sensor lead and an epoxy potting.

16 Claims, 4 Drawing Sheets

BUSWAY JOINT INTEGRAL TEMPERATURE SENSOR

BACKGROUND

Technological Field

The present disclosure relates to a busway temperature sensing system, and more particularly to a system using an embedded and isolated temperature sensor.

Description of Related Art

A variety of devices are known for ensuring electrical busway do not over heat. Current technology uses a temperature sensor that is mounted externally to busway housing. The internal temperature of the electrical joint is determined by correlating it to the busway housing temperature. The problem with this method as that the temperature correlation between the housing and the electrical joint is not consistent.

Correlation is dependent on the heat generation within the electrical connection. As heat generation increases, the correlation worsens, since a greater joint-to-housing temperature differential is required to transfer the heat to the housing. This results in the temperature increase of the housing to be less than the temperature increase of the electrical joint. The correlation is affected by manufacturing variations that affect the internal thermal resistance of the busway. These manufacturing variations include variations in material thickness, material properties, assembly methods, etc. The correlation is affected by the thermal mass of the busway. The thermal mass causes the temperature rise of the housing adjacent to the sensor to lag the temperature rise in the joint due to the busway sinking heat away from the sensor.

Conventional methods and systems have generally been considered satisfactory for their intended purpose. However, there is still a need in the art for measuring temperature within busways more accurately. There also remains a need in the art for such systems and components that are economically viable. The present disclosure may provide a solution for at least one of these remaining challenges.

SUMMARY OF THE INVENTION

A busway joint for coupling two segments of an electrical distribution busway to each other is disclosed. The busway includes a busway joint including a plurality of fins, a central body connecting each of the plurality of fins, a bolt within the central body, wherein the bolt includes a cavity housing a sensor lead and an epoxy potting. The bolt can include an outer diameter and a cavity diameter, wherein the cavity diameter is greater than half of the body diameter. The cavity diameter can be at least ¼ inches. The bolt can include a first end and a second end, the first end having a bolt head, the second end having a thread. A torque limiting nut can be threaded to the second end. The bolt head can include a hole passing therethrough. The sensor can be fully immersed within the bolt. A bolt retainer plate can be connected to the plate head.

The epoxy potting can have a thermal conductivity of at least 0.68 W/(mK). The bolt can include a steel material. The sensor can be a thermistor, wherein the thermistor has an operating range of −30c to 150 C inclusive and a temperature tolerance of +/−0.5 C. The sensor can be electrically isolated.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject invention appertains will readily understand how to make and use the devices and methods of the subject invention without undue experimentation, preferred embodiments thereof will be described in detail herein below with reference to certain figures, wherein.

DETAILED DESCRIPTION

Figure 1:
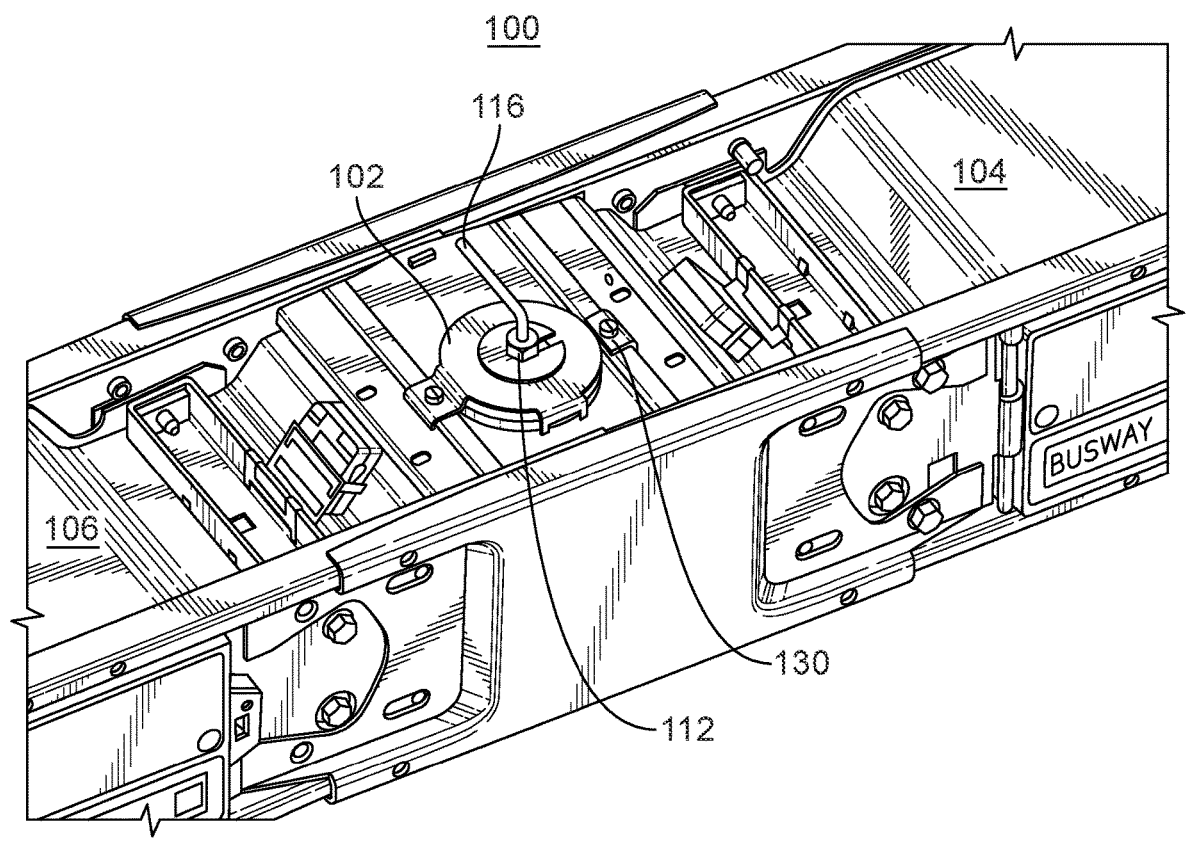
FIG. 1 is a perspective view of a busway system.
Figure 2:
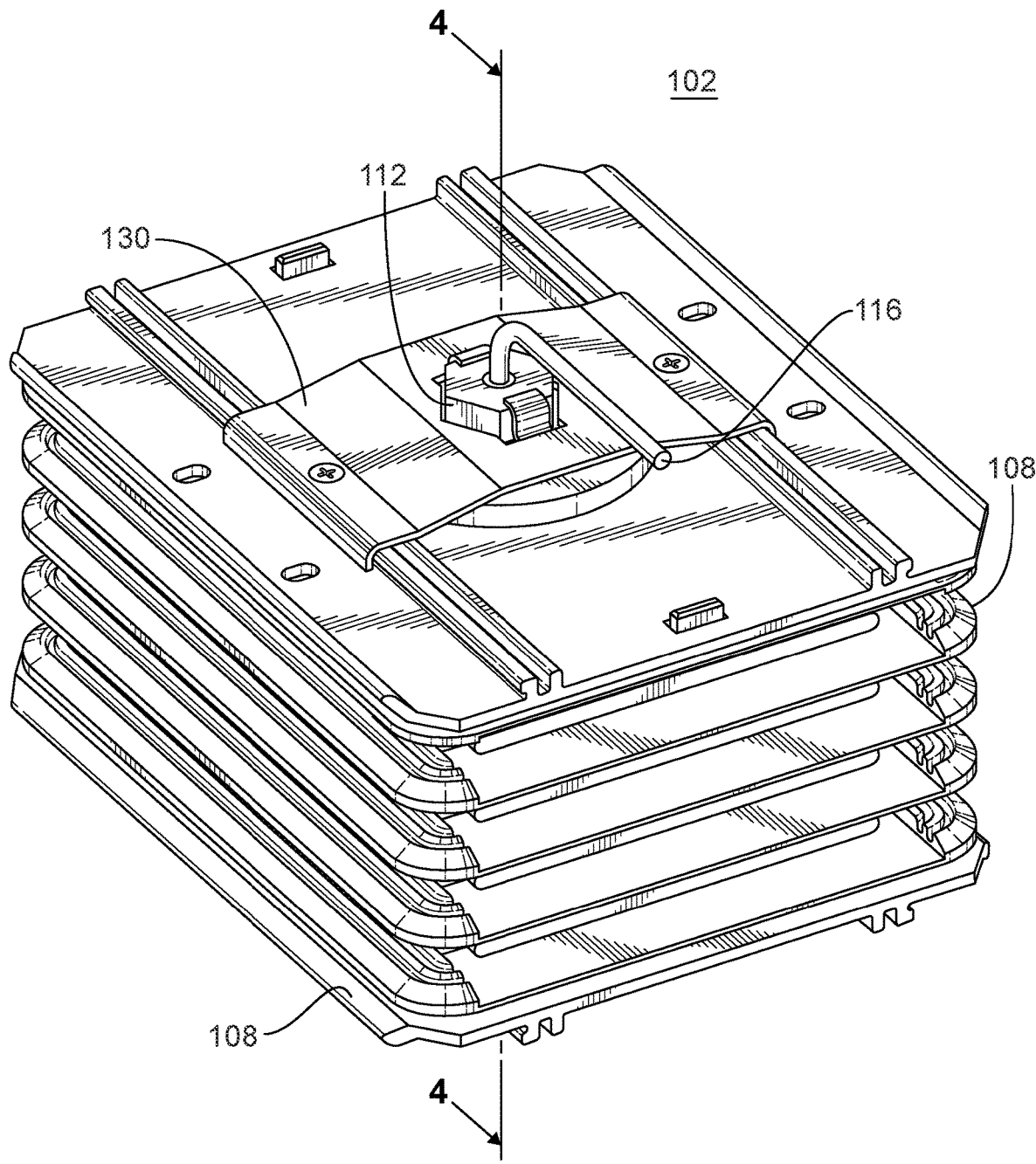
FIG. 2 is a perspective view of a busway joint of the busway system of FIG. 1, showing the fins of the busway joint.
Figure 3:
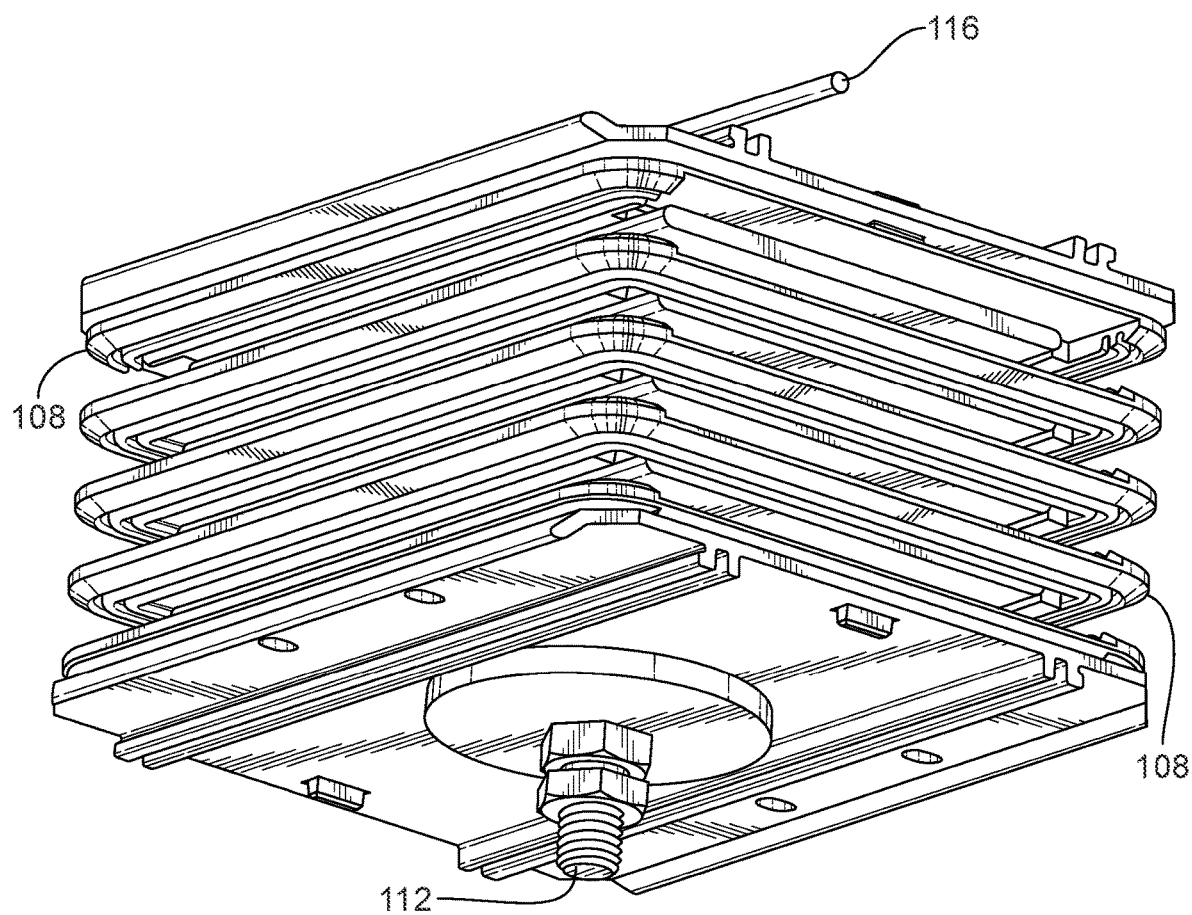
FIG. 3 is a perspective view of a busway joint of the busway system of FIG. 1, showing an underside of the busway joint.

Reference will now be made to the drawings wherein like reference numerals identify similar structural features or aspects of the subject invention. For purposes of explanation and illustration, and not limitation, a partial view of an exemplary embodiment of a busway having a screw for measuring internal temperature of the busway in accordance with the invention is shown in FIG. 1 and is designated generally by reference character 100. Other embodiments of the screw in accordance with the invention, or aspects thereof, are provided in FIGS. 2-4 as will be described. The methods and systems of the invention can be used to better track internal temperatures and provide feedback on the health of the busway.

FIG. 1 shows a busway system 100 for providing and routing electricity and data connections. The system can be used to joining data centers, controllers, servers, HVAC units, load managers joint 102 coupling two segments 104/106 of an electrical distribution busway 100 to each other. The distribution busway 100 is responsible for conducting electricity. The joint 102 includes a plurality of fins 108 and a central body 110 (shown in FIG. 4) connecting each of the fins 108 (shown in FIGS. 2 and 3). The central body 110 includes a bolt 112 housing a sensor 114 (shown in FIG. 4) with sensor leads 116 coming out of the bolt 112. The sensor leads 116 can be coupled to a controller or central command, which is responsible for operating the busway in order to ensure the internal temperature does not go above a maximum of 105 C.

Figure 4:
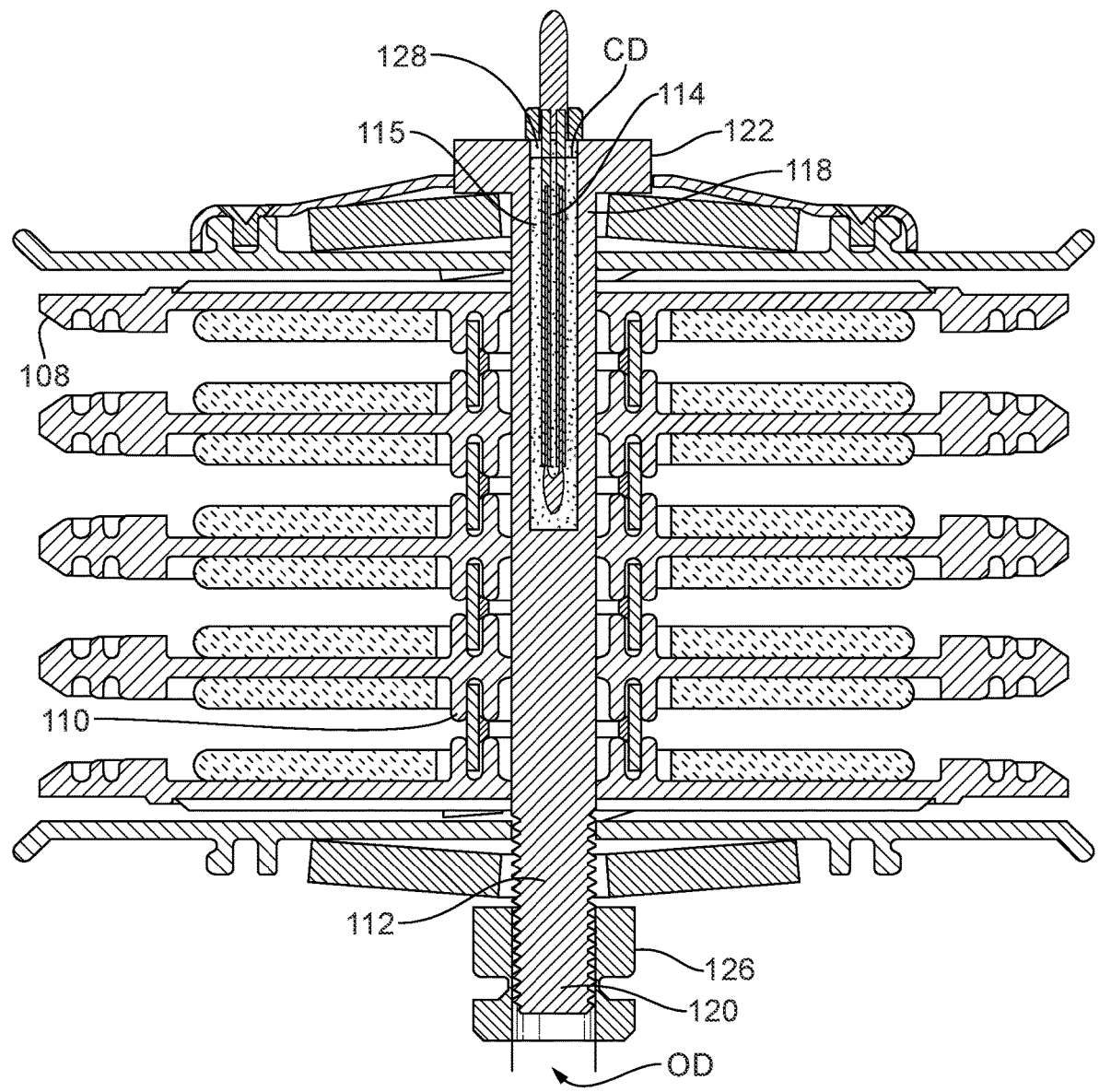
FIG. 4 is a cross section view of the busway joint of FIG. 1, showing the inner portion of the screw.

FIG. 4 shows details of the inside of the bolt 112. The bolt 112 includes an outer diameter (OD) and a cavity diameter (CD). The cavity diameter is greater than half of the body diameter. For instance, if the cavity diameter (CD) is 1 inch thick, the body diameter has to less than 2 inches thick. The cavity diameter must be at least ¼ inches in order to ensure proper torqueing and heat conductivity, but is preferred to be 5/16 inches.

The bolt 112 includes a first end 118 with a bolt head 122, while the second end 120 includes a thread 124. A torque limiting nut 126 is threaded to the second end 120 to further ensure that the nut 126 is not over torqued, wherein the outer head of the nut 126 breaks off when the specified tightening torque is met (60 to 80 ft-lb). The bolt head 122 includes a hole 128 to allow the sensor leads 116 to pass through. The sensor leads are connected to the sensor 114, which is fully embedded within the bolt 112. A bolt retainer plate 130 is connected to the bolt head 122 to further fix the bolt 122 in place. The bolt 112 can be made of a steel material, which allows for proper thermal conductivity and is able to stand up to the required torqueing and operating heat stresses The sensor 114 is a thermistor, and is embedded within the bolt 112 using epoxy 115 in order to electrically isolate is and ensure that it's not touching the sides of the bolt. The epoxy potting includes a thermal conductivity of at least 0.68 W/(mK). In order to function properly the thermistor has to have an operating range of −30c to 150 C inclusive. The thermistor has a temperature tolerance of about +/−0.5 C.

The methods and systems of the present disclosure, as described above and shown in the drawings, provide for a busway temperature sensor with superior properties including but not limited to increased reliability and response time. While the apparatus and methods of the subject disclosure have been showing and described with reference to embodiments, those skilled in the art will readily appreciate that changes and/or modifications may be made thereto without departing from the spirit and score of the subject disclosure.

What is claimed is:

1. A busway joint for coupling two segments of an electrical distribution busway to each other, the busway joint comprising:
    a plurality of fins;
    a central body connecting each of the plurality of fins; and
    a bolt within the central body, wherein the bolt includes a cavity extending through a bolt head and into a shaft of the bolt and housing a sensor lead, and wherein the bolt further includes an epoxy potting surrounding the sensor lead and filling the cavity along substantially an entire longitudinal length of the cavity.

2. The joint of claim 1, wherein the bolt includes an outer diameter and a cavity diameter, wherein the cavity diameter is greater than half of the outer diameter.

3. The joint of claim 2, wherein the cavity diameter is at least ¼ inches.

4. The joint of claim 1, wherein the bolt includes a first end and a second end, the first end having the bolt head, the second end having a threaded portion.

5. The joint of claim 4, further comprising a torque limiting nut threaded to the second end.

6. The joint of claim 4, wherein the bolt head includes a hole passing therethrough.

7. The joint of claim 4, wherein the sensor is fully immersed within the bolt.

8. The joint of claim 4, further comprising a bolt retainer plate connected to a plate head.

9. The joint of claim 1, wherein the epoxy potting includes a thermal conductivity of at least 0.68 W/(mK).

10. The joint of claim 1, wherein the bolt includes a steel material.

11. The joint of claim 1, wherein the sensor is a thermistor.

12. The joint of claim 11, wherein the thermistor has an operating range of −30 c to 150 C inclusive.

13. The joint of claim 11, wherein the thermistor includes a temperature tolerance of +/−0.5 C.

14. The joint of claim 1, wherein the sensor is electrically isolated.

15. A method of measuring health of a busway comprising;
    securing a thermistor within epoxy within a cavity of a bolt of a busway joint, wherein the cavity extends through a bolt head and into a shaft of the bolt and the epoxy surrounds the thermistor and fills the cavity along substantially an entire longitudinal length of the cavity;
    operating the busway;
    measuring an electrical resistance of the thermistor; and
    pausing operation of the busway or taking correcting action if the electrical resistance reaches a known threshold.

16. The method of claim 15, wherein the threshold is 105 degrees C.

* * * * *